May 18, 1926.
A. MASTER
1,585,256
FRICTION CLUTCH
Filed August 21, 1924    2 Sheets-Sheet 1
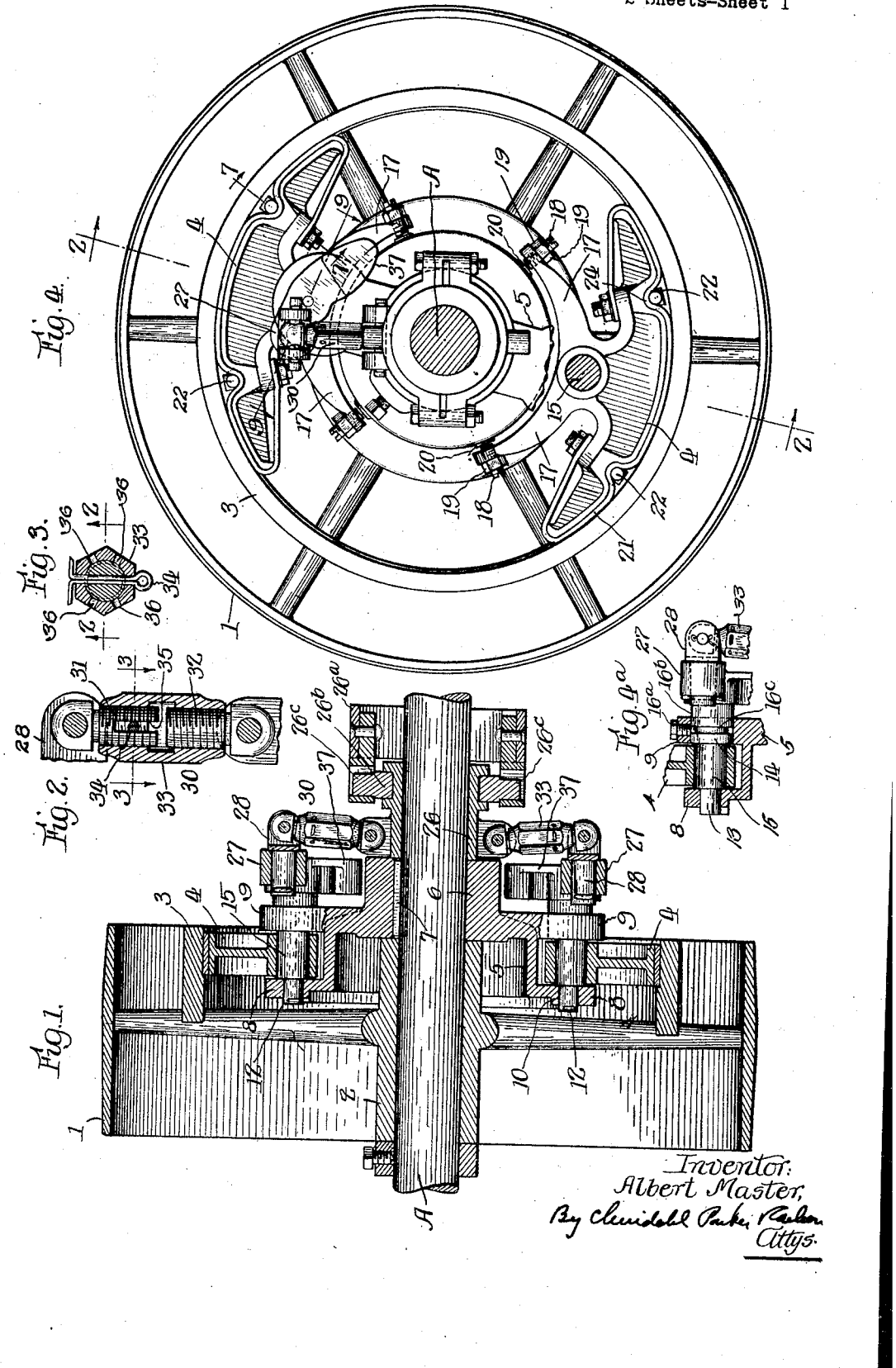
Inventor:
Albert Master,
By Churchill Parker Redden
Attys.

May 18, 1926.
A. MASTER
FRICTION CLUTCH
Filed August 21, 1924  2 Sheets-Sheet 2
1,585,256
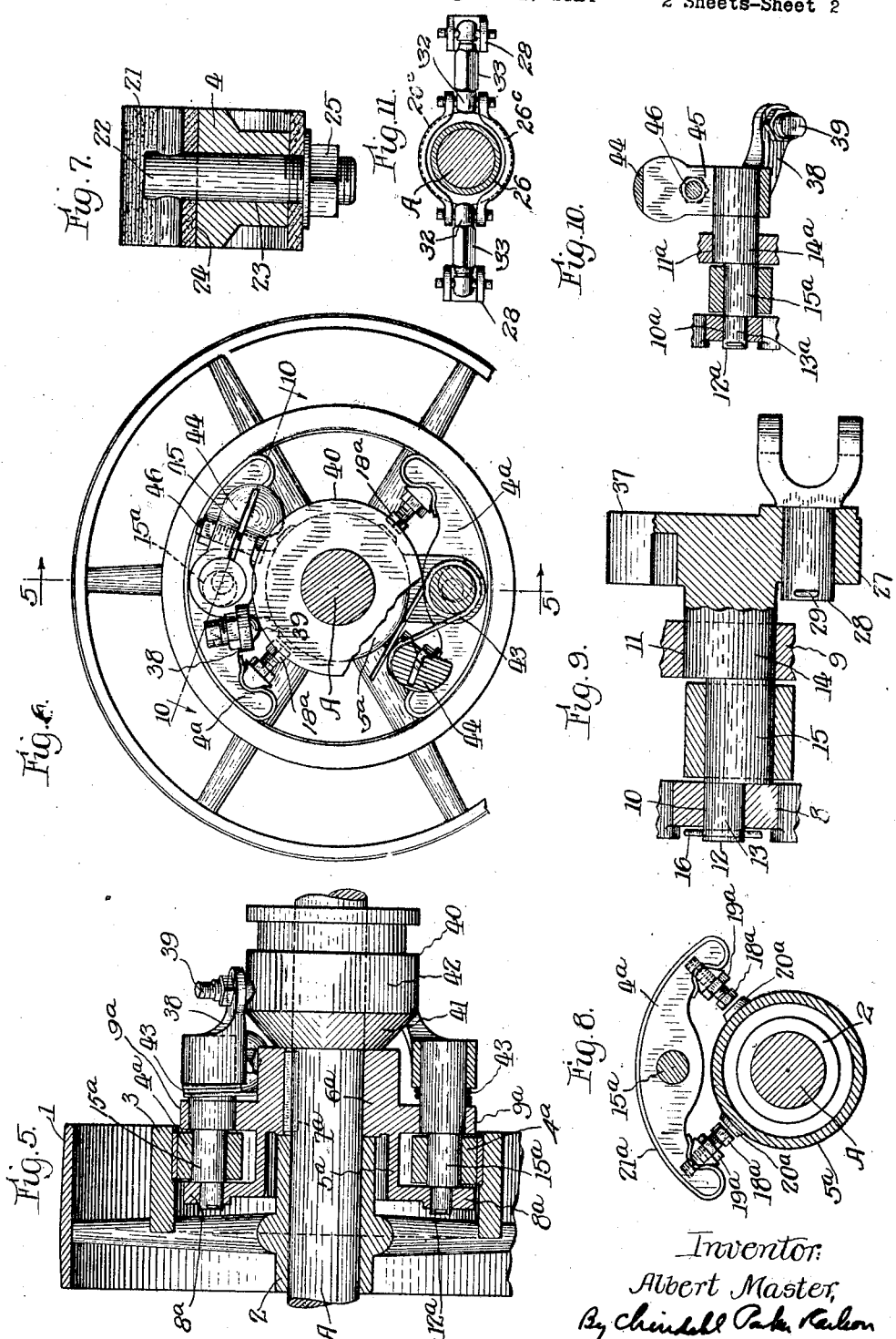
Inventor:
Albert Master,
By Churchill Parker Railson
Attys.

Patented May 18, 1926.

1,585,256

UNITED STATES PATENT OFFICE.

ALBERT MASTER, OF PARK RIDGE, ILLINOIS.

FRICTION CLUTCH.

Application filed August 21, 1924. Serial No. 733,363.

Friction clutches of the type herein referred to are arranged to be thrown into operation by means including a toggle adapted to be operated by a sliding collar, or by means including a finger adapted to be moved by a sliding cone. Finger-operated clutches can be bored out to receive proportionately larger shafts than toggle operated clutches. Moreover, finger-operated clutches may be made of less outside diameter than toggle-operated clutches, and hence are better adapted for use where small clutches are needed and where the clutch must be mounted upon a relatively large shaft. Toggle-operated clutches cannot conveniently be used in duplex clutch pulley installations providing forward and reverse motion, because the sliding collar cannot be moved to throw in one clutch after it has been moved to throw out the other. The toggle-operated clutch, however, may be positively thrown out of action and has certain other advantages, hence it is desirable that a manufacturer of friction clutches be able to supply the demand for both finger-operated and toggle-operated clutches of the same general type of construction.

It is necessary that clutches be designed to operate properly at specified rotative speeds and that they be capable of transmitting various amounts of power. In view of these variations in speed and power, it is desirable to provide a type of friction clutch construction which may be built in various sizes to suit varying conditions.

The object, then, of this invention, generally stated, is to produce a type of friction clutch construction which shall be uniformly efficient and satisfactory when built in various sizes to operate at various speeds and transmit various loads, and which shall be relatively cheap to manufacture, notwithstanding the varying conditions of speed, load and size.

Particular objects are to attain simplicity in construction, to provide adjustment for taking up wear and looseness in the parts, and to produce a clutch adapted to be easily thrown into and out of operation while the driving element is being rotated.

In the accompanying drawings, Figure 1 is a central sectional view of a toggle-operated friction clutch embodying the features of my invention, the view being taken in the plane of line 2—2 of Fig. 4.

Fig. 2 is a fragmental sectional view of the toggle, the view being taken in the plane of line 2—2 of Fig. 3.

Fig. 3 is a section on line 3—3 of Fig. 2.

Fig. 4 is a side elevation of the clutch shown in Fig. 1.

Fig. 4ª is a detail view of an alternative construction.

Fig. 5 is a fragmental sectional view of a finger-operated clutch embodying the features of my invention, the view being taken in the plane of line 5—5 of Fig. 6.

Fig. 6 is a fragmental side elevation of the clutch shown in Fig. 5.

Fig. 7 is a sectional view on line 7—7 of Fig. 4.

Fig. 8 is a detail view illustrating one of the shoes comprised in the clutch shown in Fig. 6.

Fig. 9 is a section on line 9—9 of Fig. 4.

Fig. 10 is a section on line 10—10 of Fig. 6.

Fig. 11 is a fragmentary view showing a modified means for connecting the toggles to the clutch collar.

While clutches embodying the present invention may also be constructed in the form of shaft couplings, the embodiment which has been selected to illustrate the invention comprises a pulley 1 adapted to receive a drive belt or driven belt (not shown). Said pulley is provided with a hub 2 rotatably mounted upon a shaft A in any suitable manner. Rigidly connected to the spokes of the pulley 1 is a rim 3, the inner periphery of which is finished and serves as a clutch surface. If the pulley 1 with its rim 3 be considered the driving element of the clutch, the driven element comprises a suitable number of shoes 4 the outer sides of which are concentric with and adapted to engage the inner surface of the rim 3. Two diametrically opposite shoes are herein shown. The shoes 4 are mounted upon a spider 5 having a hub or sleeve 6 mounted upon the shaft A. The sleeve 6 is rigidly secured to the shaft A in any suitable manner, as, for example, by means of a key 7. Upon the spider 5 are formed two pairs of lugs 8 and 9 having alined openings 10 and 11 (Fig. 9) extending parallel to the axis of rotation of the spider. Said openings constitute bearings for a shaft 12 having a portion 13 adapted to be mounted in the bearing opening 10, and a portion 14 adapted to fit within the bearing opening 11, the portions 13 and 14 being axially alined. Between the shaft portions 13 and 14 is an eccentric portion 15. The bearing opening 11 is made large enough to allow the passage of the eccentric 15 when the shaft 12 is inserted in the bearings 10 and 11. The shaft is held against withdrawal from its bearings by suitable means, such as a cotter pin 16. In constructions where a cotter pin would be inaccessible, the securing means shown in Fig. 4ª may be used. Said means comprises a cap screw 16ª seated in the lug 9 and having a reduced inner end 16ᵇ that extends into an annular groove 16ᶜ in the shaft portion 14.

The shoes 4 are pivotally mounted upon the eccentrics 15. In the form of clutch shown in Figs. 1 and 4, each shoe is provided with two arms 17 extending from opposite sides of the pivotal center of the shoe. Each of these arms is provided at each free end with a stop screw 18 and a lock nut 19, the inner ends of said screws being arranged to engage stop surfaces 20 on the spider 5 and thus serve to prevent the shoe from tilting into engagement with the friction rim 3 after the clutch has been thrown out.

The shoes 4 are provided with friction surfaces which may be of any suitable character, but which preferably consist of material such as is used for automobile brake band linings. Herein the strip of friction material 21 is shown as held in place by means of two T-bolts 22 (Fig. 7) extending through openings 23 through the shoe, the heads of said T-bolts being arranged to lie within transverse grooves 24 in the outer sides of the shoe 4. The T-bolts are held in place by means of nuts 25. The ends of the strips of friction material 21 are perforated to receive the T-bolts, the nuts 25 on the T-bolts serving to draw the friction material taut.

The means shown in Figs. 1 to 4 for turning the shafts 12 to move the friction shoes 4 into and out of engagement with the rim 3 comprises a collar 26 mounted to slide longitudinally of the shaft A and arranged to be slid by any suitable means (in practice, generally a hand lever 26ª). Rotatably mounted on the collar 26 is a ring 26ᵇ having studs 26ᶜ engaged by the hand lever 26ª. Rigid with each shaft 12 is an arm 27 (Figs. 1 and 9) in which is pivotally mounted a clevis 28 which is held in place by means of a cotter pin 29. Pivoted in the clevis 28 is an extensible link 30 (Fig. 2) which comprises two oppositely-threaded screws 31 and 32 and a correspondingly-threaded nut 33 engaging both of said screws. The screw 32 is pivoted to the collar 26. In the modified form shown in Fig. 11, the screws 32 of the two links 30 are pivotally secured between the opposite ends of two curved members 26ᵉ which engage opposite sides of the collar 26, and serve to equalize the pressure on the links 30 for different adjustments of the latter. To prevent rotation of the nut 33 due to vibration of the machinery, I provide a cotter pin 34 extending through a radial slot 35 in the screw 31 and adapted to extend through various pairs of alined openings 36 in the nut 33. It will be seen that when the hand lever 26ª is swung to move the collar 26 along the shaft A, the clevis 28 will turn in the arm 27 to adjust itself to the different angular positions of the arm 27 with respect to the link 30, as the clutch is opened and closed. Thereupon the clevises 28 through the links 30 will oscillate the collar 26 slightly on the shaft A to accommodate the collar to different angular positions of the links 30.

The throwing-in movement of the collar 26 is limited by contact of said collar with the end of the hub 6 of the spider 5. When the collar is in contact with said hub, the links 30 are slightly past dead center. It will be evident that the nuts 33 may be adjusted to take up all wear and looseness of parts so that when the collar 26 is in contact with the hub 6, the shoes 4 are in tight contact with the rim 3. When the collar 26 is slid to the right, as viewed in Fig. 1, the shafts 12 are caused to turn in the direction to swing the eccentrics 15 away from the rim 3 sufficiently to provide ample clearance between the shoes and the rim 3. To assist in thus throwing out the shoes against the action of centrifugal force, I provide each shaft 12 with an arm 37 which serves as a counterweight to overcome such force. This counterweight is essential to prevent the clutch from being thrown in by centrifugal force after the operator has released the lever used in throwing out the clutch.

Centrifugal force acting upon the shoe 4 and the counterweight 37 causes pressure in the bearings 10 and 11 of the eccentric shaft 12. This pressure resists turning movement of the eccentric shaft, which is advantageous in that it resists the throwing in of the clutch by centrifugal force after the operator has thrown out the clutch and released the hand lever.

It will be seen that the arm 27 and the link 30 constitute a toggle by which the eccentric shaft 12 is positively connected to the collar 26, and whereby the shoe 4 may be positively moved into and out of contact with the rim 3.

Figs. 5, 6 and 10 illustrate a finger-operated clutch of the same general type as the toggle-operated clutch just described but of smaller diameter. Corresponding parts have been marked with similar reference numbers having exponents. Owing to the necessity of economizing space, the shoe 4ª has no arms 17, the stop screws 18ª being carried directly by the shoe. The use of T-bolts to secure the friction material 21ª to the shoe being impracticable for lack of space, said friction material is held in place by the stop screws 18ª and the lock nuts 19ª.

To the outer end of each eccentric shaft 12ª is secured a finger 38 which carries an adjustable stop screw 39 adapted to be engaged by a collar 40 slidable on the shaft A. The collar 40 has a conical surface 41 adapted to force the finger 38 in the direction to press the shoes 4ª against the rim 3, and a cylindrical surface 42 to hold the clutch thrown in.

To move the shoes 4ª away from the rim 3 when the collar 40 is slid away from the finger 38, I provide a torsion spring 43 coiled about each eccentric shaft 12ª, one end of the spring bearing against the hub 6ª of the spider 5ª and the other end bearing against a counterweight 44 formed integral with the finger 38.

As hereinbefore stated, clutches are operated at various speeds. The shoes 4ª will vary in weight in clutches of different sizes. It is desirable to use castings 38—44 in all the different sizes of finger-operated clutches. The counterweight 44 should not be so heavy as to make the clutch hard to throw in. For these reasons, a spring 43 is used to supplement the counterweight. The counterweight causes pressure in the eccentric shaft bearings 10ª and 11ª, whereas the spring 43 does not.

It is practicable to employ counterweights 44 of the same weight and springs 43 of the same torsion in clutches of various sizes, because the pressure in the eccentric shaft bearings varies with the weight of the shoes 4ª.

The eccentric shaft 12ª and the casting constituting the finger 38 and the counterweight 44 are adjustably secured together by suitable means, as by forming a slot 45 in the counterweight, said slot extending to the bore that receives the shaft 12ª, and by using a screw 46 to contract the slotted portion of the bore onto the shaft.

The type of clutch illustrated in Figs. 1 and 5 is especially well adapted for high speeds. At high speeds, prior clutches have given trouble, owing to the tendency of centrifugal force to throw in the clutch.

When the friction material 21 or 21ª requires replacement, the cotter pin in the inner end of the eccentric shaft is removed and the shaft pulled out, whereupon the shoe may be moved around until it is clear of the eccentric shaft bearings 8 and 9 or 8ª and 9ª, and then removed.

It will be apparent from Figs. 4 and 6 that the friction surface is large in comparison with friction clutches of the prior art, embracing as it does nearly two-thirds of the circumference of the rim 3. The large area of contact and the great pressure obtainable through the toggles and the eccentrics insures long life and great power.

When the clutch is being thrown in, the shoes, being free to swing on the eccentrics, seat themselves perfectly in the rim 3. When the clutch is being disengaged, the eccentrics not only release the pressure but positively withdraw the shoes and lock them against the spider, with the stop screws 18 or 18ª seated against the surfaces 20 or 20ª. The shoes are then wholly out of contact with the rim 3, hence there is no unnecessary wear and no fire hazard.

The parts are so designed that a minimum amount of machining is required for their manufacture; and they may be easily and quickly assembled.

I claim as my invention:

1. A friction clutch having, in combination, a driving element and a driven element, one of said elements comprising a friction rim and the other comprising a spider having a supporting sleeve, said spider also having a pair of lugs having alined bearing openings; a shaft having two concentric portions journaled in said bearing openings and an intermediate eccentric, one of said bearing openings being large enough to allow passage of the eccentric in assembling; said shaft extending parallel with the axis of the clutch; a shoe pivotally mounted on the eccentric and having a concentric surface adapted to engage said rim; two stops on said shoe at opposite sides of its axis adapted to engage the spider when the shoe is thrown out of engagement with the rim; a collar slidable longitudinally of the axis of the clutch; means connected to said eccentric shaft and arranged to be actuated by said collar to turn the eccentric shaft in the direction to force the shoe against the rim; and a counterweight attached to said eccentric shaft, said counterweight and the friction in the bearings of the eccentric shaft serving to counteract the tendency of centrifugal force to move the shoe into engagement with the rim when the clutch is thrown out.

2. A friction clutch having, in combination, a driving element and a driven element, one of said elements comprising a friction rim and the other comprising a spider having a supporting sleeve, said spider also having a pair of lugs having alined bearing openings; a shaft having two concentric portions journaled in said bearing openings and an intermediate eccentric; said shaft extending parallel with the axis of the clutch; a shoe pivotally mounted on the eccentric and having a concentric surface adapted to engage said rim; two stops on said shoe at opposite sides of its axis adapted to engage the spider when the shoe is thrown out of engagement with the rim; a collar slidable longitudinally of the axis of the clutch; means connected to said eccentric shaft and arranged to be actuated by said collar to turn the eccentric shaft in the direction to force the shoe against the rim; and a counterweight attached to said eccentric shaft, said counterweight serving to counteract the tendency of centrifugal force to move the shoe into engagement with the rim when the clutch is thrown out.

3. A friction clutch having, in combination a driving element and a driven element, one of said elements comprising a friction rim and the other comprising a spider having a supporting sleeve, said spider also having a pair of alined bearing openings; a shaft having two concentric portions journaled in said bearing openings and an intermediate eccentric; said shaft extending parallel with the axis of the clutch; a shoe pivotally mounted on the eccentric and having a concentric surface adapted to engage said rim; two stops on said shoe at opposite sides of its axis adapted to engage the spider when the shoe is thrown out of engagement with the rim; a collar slidable longitudinally of the axis of the clutch; and means connected to said eccentric shaft and arranged to be actuated by said collar to turn the eccentric shaft in the direction to force the shoe against the rim.

4. A friction clutch having, in combination, a driving element and a driven element, one of said elements comprising a friction rim and the other comprising a spider having a supporting sleeve, said spider also having a pair of alined bearing openings, a shaft having two concentric portions journaled in said bearing openings and an intermediate eccentric, said shaft extending parallel with the axis of the clutch; a shoe pivotally mounted on the eccentric and having a concentric surface adapted to engage said rim; means to hold said shoe against pivotal movement on the eccentric when the shoe is withdrawn from the rim; a collar slidable longitudinally of the axis of the clutch; a toggle connecting said eccentric shaft and said collar; and a counterweight attached to said eccentric shaft, said counterweight serving to counteract the tendency of centrifugal force to move the shoe into engagement with the rim when the clutch is thrown out.

5. A friction clutch having, in combination, a driving element and a driven element, one of said elements comprising a friction rim and the other comprising a spider having a supporting sleeve, said spider also having a pair of lugs having alined bearing openings, a shaft having two concentric portions journaled in said bearing openings and an intermediate eccentric, one of said bearing openings being large enough to allow passage of the eccentric in assembling; said shaft extending parallel with the axis of the clutch; a shoe pivotally mounted on the eccentric and having a concentric surface adapted to engage said rim; means to hold said shoe against pivotal movement on the eccentric when the shoe is withdrawn from the rim; a collar slidable longitudinally of the axis of the clutch; means connected to said eccentric shaft and arranged to be actuated by said collar to turn the eccentric shaft in the direction to force the shoe against the rim; and a counterweight attached to said eccentric shaft, said counterweight and the friction in the bearings of the eccentric shaft serving to counteract the tendency of centrifugal force to move the shoe into engagement with the rim when the clutch is thrown out.

6. A friction clutch having in combination, a driving element and a driven element, one of said elements comprising a friction rim and the other comprising a spider having a supporting sleeve, said spider also having a pair of alined bearing openings; a shaft having two concentric portions journaled in said bearing openings and an intermediate eccentric; said shaft extending parallel with the axis of the clutch; a shoe pivotally mounted on the eccentric and having a concentric surface adapted to engage the inner periphery of said rim; means to hold said shoe against pivotal movement on the eccentric when the shoe is withdrawn inwardly away from the rim; a collar slidable longitudinally of the axis of the clutch; and means connected to said eccentric shaft and arranged to be actuated by said collar to turn the eccentric shaft in the direction to force the shoe against the rim.

7. A friction clutch having, in combination, a driving element and a driven element, one of said elements comprising a friction rim and the other comprising a spider having a supporting sleeve; an eccentric pivotally supported by said spider to swing on an axis extending parallel with the axis of the clutch; a shoe pivotally mounted on the eccentric and having a concentric surface adapted to engage the inner periphery of said rim; means to hold said shoe against pivotal movement on the eccentric when the shoe is withdrawn inwardly away from the rim; and means to turn the eccentric to force the shoe against the rim and withdraw it therefrom.

In testimony whereof, I have hereunto affixed my signature.

ALBERT MASTER.